T. V. BUCKWALTER.
THRUST BEARING.
APPLICATION FILED JAN. 21, 1920.
1,375,359.
Patented Apr. 19, 1921.
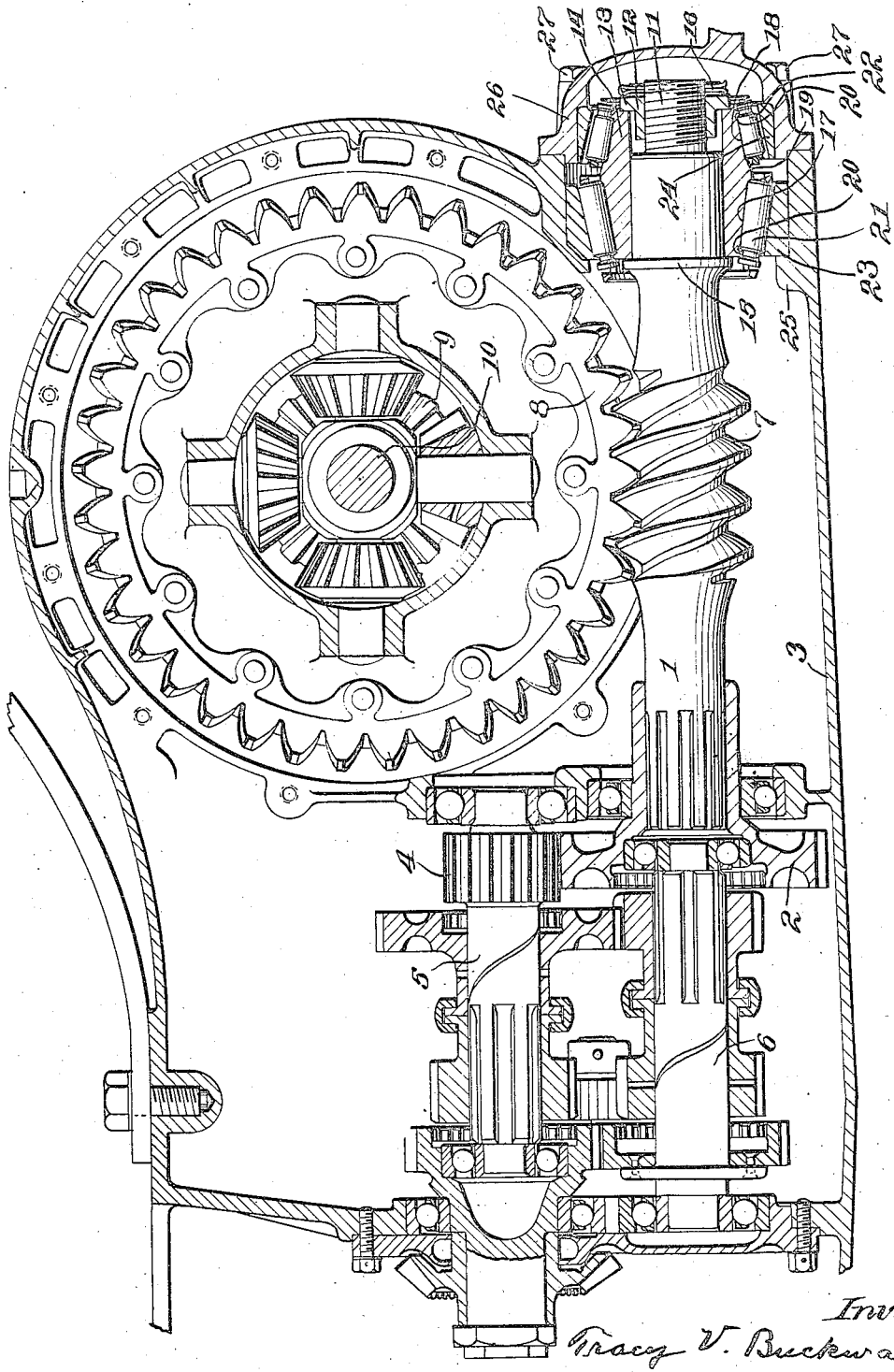
Inventor
Tracy V. Buckwalter,
by Carr & Carr,
his Attys.

UNITED STATES PATENT OFFICE.

TRACY V. BUCKWALTER, OF CANTON, OHIO, ASSIGNOR TO THE TIMKEN ROLLER BEARING COMPANY, OF CANTON, OHIO, A CORPORATION OF OHIO.

THRUST-BEARING.

1,375,359.  Specification of Letters Patent.  Patented Apr. 19, 1921.

Application filed January 21, 1920. Serial No. 352,938.

*To all whom it may concern:*

Be it known that I, TRACY V. BUCKWALTER, a citizen of the United States, and a resident of the city of Canton, in the county of Stark and State of Ohio, have invented a new and useful Improvement in Thrust-Bearings, of which the following is a specification.

My invention relates to antifriction bearings for taking care of the end thrust of a worm shaft or the like and has for its principal objects to simplify the construction and reduce the cost of such bearings. It consists principally in eliminating adjusting elements heretofore commonly used; and it also consists in the combinations and arrangements of parts hereinafter described and claimed.

The accompanying drawing, wherein like reference numerals refer to like parts wherever they occur, is a vertical longitudinal section through a tractor axle embodying my invention and illustrates a propeller shaft 1 which has a drive gear 2 splined thereon at one end and has its other end mounted in a thrust bearing provided therefor on the housing or axle 3 of a motor vehicle. The drive gear 2 is supported on ball bearings carried in a pedestal which projects upwardly from the bottom of the housing 3 and meshes constantly with the drive gear 4 on the main shaft 5 of a transmission mechanism. The drive gear 2, which is fixed to the forward end of the propeller shaft 1, can also be coupled to the countershaft 6 of the transmission. The transmission, which is entirely inclosed in the housing 3, can be of any desired type and is adapted to be coupled to the power shaft leading from the motor (not shown) in the usual manner. The transmission is also provided with the usual sliding gears for obtaining different forward speeds and an idler gear and a reversing gear for imparting a reverse rotation to the propeller shaft 1. This propeller shaft has a worm 7 which meshes with a worm gear 8 of a differential mechanism 9 mounted in the axle housing 3 and operatively connected to the driving shaft sections 10 which in turn are connected to the traction wheels (not shown) according to any of the well known systems used in the construction of automobiles, tractors, and the like.

The worm shaft 1 has its outer end 11 reduced in diameter and threaded to receive a threaded nut 12 that has an outwardly projecting annular shoulder 13. Mounted on the adjacent end portion of the worm shaft 1, preferably by being pressed tightly thereon, is a tubular inner bearing member 14, whose inner end bears against an annular rib or shoulder 15 provided therefor on the worm shaft. The outer end of this inner bearing member incloses the threaded portion 11 of the shaft, and the annular flange 13 of the nut 12 bears against the outer end of said inner bearing member 14 so as to hold said inner bearing member against the shoulder 15 on said shaft. Rotation of the nut 12 on the threaded end 11 of the worm shaft 1 is prevented by means of a cotter pin 16, which extends through a transverse hole in the end of the worm shaft and, the nut, which is made after the manner of a castle nut, is provided with slots in its outer end to receive the projecting ends of the cotter pin. By this arrangement, the inner bearing member is rigidly held in relation to said shaft.

The inner bearing member 14 has two conical surfaces 17 and 18 tapering toward the respective ends thereof which are separated by an intermediate rib 19, and near the respective ends of the inner bearing member are annular ribs 20 adapted to coöperate with grooves of conical antifriction rollers 21 and 22 arranged on opposite sides of the rib 19. The outer bearing members are conical cups 23 and 24 whose inner surfaces are designed to coöperate with the respective grooved antifriction rollers 21 and 22 above mentioned. The inner cup 23 fits in the angle provided therefor by forming an inwardly extending annular shoulder 25 inside of the casing or fixed housing 3. The outer bearing cup 24 is preferably pressed into an annular recess formed therefor in a cap 26 which is secured to the housing 3 by a series of bolts 27.

By the arrangement described, the end thrust of the shaft is taken care of, whether that end thrust is inwardly or outwardly. Thus, during the forward drive the end thrust of the worm shaft is inwardly and is taken up by the inner rollers 21, the outer rollers 22 being spaced slightly away from the outer bearing cup 24 in the position shown in the drawing. During the reverse drive, the end thrust of the worm shaft is outwardly and is taken up by the outer rollers 22. the inner rollers 21 being spaced away from the outer bearing cup 23 as the splining of the shaft permits it to move endwise sufficiently to take up the clearance between the idle rollers and their cup when the drive is reversed so as to require said idle rollers to become the working rollers. As indicated in the drawing, the rollers 21 that take care of the end thrust during the forward drive are preferably larger than the rollers 22 that take care of the end thrust during reverse drive. It is particularly noted that by reason of the peculiar arrangement of the parts there is no need for adjustment relative to each other. In case the parts become so badly worn as to require adjustment, new parts may be quickly substituted for those that are worn.

What I claim is:

1. In worm-gearing, a housing, a worm shaft, a doubly conical inner bearing member secured to the end portion of said shaft, series of conical rollers for the conical surfaces thereof, a bearing cup for the inner series of rollers mounted in the housing, a cap opposite the end of said shaft and removably secured to said housing, and a bearing cup for the outer series of rollers mounted in said cap.

2. In worm-gearing, a housing, a worm shaft having doubly conical surfaces, series of conical rollers for the conical surfaces thereof, a bearing cup for the inner series of rollers mounted in the housing, a cap opposite the end of said shaft and removably secured to said housing, and a bearing cup for the outer series of rollers mounted in said cap.

3. In worm-gearing, a housing, a worm shaft having concentric conical bearing surfaces disposed base to base, series of conical rollers for the conical surfaces thereof, a bearing cup for the inner series of rollers mounted in the housing, a bearing cup for the outer series of rollers, and a member secured to said housing for holding said last mentioned cup in position, said cups being spaced apart far enough to afford clearance between one series of rollers and the cup therefor.

4. In worm-gearing, a housing, a worm shaft, a doubly conical inner bearing member sleeved on the end portion of said shaft, series of conical rollers for the conical surfaces thereof, a bearing cup for the inner series of rollers mounted in the housing, a cap inclosing the end of said shaft and removably secured to said housing, a bearing cup for the outer series of rollers mounted in said cap, and a nut on the end of said shaft for holding said inner bearing member in position.

5. In worm-gearing, a housing, a worm shaft, an inner bearing member secured on said shaft and having concentric conical surfaces disposed base to base, series of conical rollers for the conical surfaces thereof, a bearing cup for the inner series of rollers mounted in said housing, a nut on the end of said shaft engaging said inner bearing member for holding the same in position on said shaft, a cap inclosing the end of said shaft and a nut thereon and removably secured to said housing, and a bearing cup for the outer series of rollers mounted in said cap.

6. In worm-gearing, a housing, a worm shaft having an annular shoulder near its end, a doubly conical inner bearing ring sleeved on the end of said shaft and abutting against the annular shoulder thereof, series of conical rollers for the conical surfaces of said bearing ring, a bearing cup for the inner series of rollers mounted in said housing, a nut on the end of said shaft for holding the inner bearing ring against the shoulder thereof, a cap for the end of said shaft removably secured to said housing and a bearing cup for the outer series of rollers mounted in said cap.

7. In worm-gearing, a housing, a worm shaft having an annular shoulder near its end, a bearing ring sleeved on the end of said shaft and abutting against the annular shoulder thereof, said bearing ring having concentric conical bearing surfaces disposed base to base, series of conical rollers for the conical surfaces of said bearing ring, said shaft having its end reduced within said bearing ring and projecting therefrom, a nut on the reduced end portion of said shaft, said nut having a portion inside of said ring and a portion abutting against the end of said ring for holding the bearing ring against the shoulder thereof, a cap for the end of said shaft secured to said housing, and a bearing cup for the outer series of rollers mounted in said cap, said outer series of rollers being of less diameter than said inner series.

8. In worm-gearing, a housing, driving shaft sections mounted in said housing, a worm driving gear for driving said axle sections, a worm shaft for driving said gear, a doubly conical inner bearing member secured to the end portion of said shaft, series of conical rollers for the conical surfaces thereof, a bearing cup for the inner series of rollers mounted in the housing, a cap opposite the end of said shaft and removably secured to said housing, and a bearing cup for the outer series of rollers mounted in said cap.

9. In gearing, a housing, a driving shaft, an inner bearing member secured to the end portion of said shaft and having doubly conical bearing surfaces, series of rollers for the bearing surfaces thereof, a bearing cup for the inner series of rollers mounted in said housing, a cap covering the end of said shaft removably secured to said housing, and a bearing cup for the outer series of rollers mounted in said cap.

10. In gearing, a housing, a driving shaft having a bearing surface near its end portion, rollers for the bearing surface thereof, a cap covering the end of said shaft and removably secured to said housing, and a bearing cup for said rollers mounted in said cap.

11. In gearing, a driving shaft having doubly conical bearing surfaces fixed thereon adjacent to one end thereof, series of conical rollers for said bearing surfaces, and fixed bearing cups inclosing and coöperating with the respective series of rollers, said cups being spaced apart far enough to afford clearance between one cup and the adjacent rollers and the shaft being movable endwise sufficiently to take up such clearance.

12. In gearing, a driving shaft, a doubly conical inner bearing member secured to the end portion of said shaft, series of conical rollers for the conical surfaces of said inner bearing member, the rollers of one of said series being of larger diameter than the rollers of the other of said series, and bearing cups inclosing and coöperating with said rollers.

13. In gearing, a driving shaft having reversely coned bearing surfaces near one end thereof, series of conical rollers for said bearing surfaces, outer bearing members for said rollers spaced apart far enough to afford clearance between one of said outer bearing members and the adjacent rollers while the other rollers bear against the other outer bearing member, and means for maintaining said outer bearing members a fixed distance apart.

14. In gearing, a driving shaft, an inner bearing member having reversely coned bearing surfaces, means for rigidly securing said inner bearing member to one end of said driving shaft, series of rollers for the reversely coned bearing surfaces of said inner bearing member, outer bearing members inclosing and coöperating with said rollers and spaced apart far enough to afford clearance for one series of rollers, and means for preventing movement of said outer bearing members endwise with respect to each other, said shaft being movable endwise sufficiently to take up such clearance.

15. In gearing, a driving shaft, an inner bearing member sleeved on one end of said driving shaft and having reversely coned bearing surfaces, said driving shaft having a shoulder portion near one end against which the inner end of said inner bearing member abuts, a member adjustably mounted on the end of said driving shaft, said member being adapted to engage the outer end of said inner bearing member for clamping the same against the shoulder portion of the driving shaft, series of conical rollers for the reversely coned surfaces of said inner bearing member, outer bearing members for said rollers spaced far enough apart to afford clearance for one series of rollers, and means for preventing said outer bearing members from spreading apart, said shaft being movable endwise to bring one or the other series of rollers into working position.

16. In gearing, a driving shaft, an inner bearing member sleeved on one end of said shaft and having reversely coned bearing surfaces, said driving shaft having an annular shoulder near one end against which the inner end of said inner bearing member abuts and having a reduced end portion adjacent to the outer end of said inner bearing member, a member adjustably mounted on the reduced end of said driving shaft, said member having a portion adapted to engage the outer end of the inner bearing member for clamping the same against the annular shoulder of said driving shaft, series of rollers for the reversely coned surfaces of said inner bearing member, outer bearing members for said rollers and means for maintaining said outer bearing members at a predetermined distance apart.

Signed at Canton, Ohio, this 29th day of Dec., 1919.

TRACY V. BUCKWALTER.